United States Patent
Aldinger et al.

(10) Patent No.: US 12,326,135 B2
(45) Date of Patent: Jun. 10, 2025

(54) JOINTED WIND TURBINE ROTOR BLADE HAVING IMPROVED TRANSITIONS BETWEEN VARYING MATERIAL COMBINATIONS

(71) Applicant: LM Wind Power A/S, Kolding (DK)

(72) Inventors: Graham Andress Aldinger, Greenville, SC (US); Scott Jacob Huth, Greenville, SC (US); Rohit Agarwal, Simpsonville, SC (US); Amir Riahi, Simpsonville, SC (US); Andrew Mitchell Rodwell, Greenville, SC (US); Thomas Merzhaeuser, Munich (DE)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/043,183

(22) PCT Filed: Aug. 31, 2021

(86) PCT No.: PCT/EP2021/073992
§ 371 (c)(1),
(2) Date: Feb. 27, 2023

(87) PCT Pub. No.: WO2022/043575
PCT Pub. Date: Mar. 3, 2022

(65) Prior Publication Data
US 2023/0323855 A1    Oct. 12, 2023

(30) Foreign Application Priority Data
Aug. 31, 2020 (GB) .................................. 2013647

(51) Int. Cl.
*F03D 1/06* (2006.01)

(52) U.S. Cl.
CPC ........ *F03D 1/0675* (2013.01); *F05B 2230/60* (2013.01); *F05B 2240/302* (2013.01); *F05B 2280/6003* (2013.01)

(58) Field of Classification Search
None
See application file for complete search history.

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| EP | 2186622 A1 | 5/2010 |
| EP | 3144526 A1 | 3/2017 |

(Continued)

OTHER PUBLICATIONS

PCT International Search Report & Opinion Corresponding to PCT/EP2021/073992 on Dec. 8, 2021.

*Primary Examiner* — Juan G Flores
(74) *Attorney, Agent, or Firm* — Dority & Manning, P.A.

(57) ABSTRACT

A method of joining first and second blade components of a rotor blade includes arranging the first blade component and the second blade component together at an interface. The first and second blade components are formed of different materials having different stiffnesses. The method further includes providing a gap at the interface of the blade components. Further, the method includes securing the blade components together by at least partially filling the gap with a filler material. Moreover, the method includes further securing the blade components together via an infusion process, wherein, during the infusion process, additional filler material further fills the gap or covers at least a portion of the filler material. In addition, the method includes allowing the filler material(s) to cure. Thus, upon curing, the (Continued)

filler material(s)—smoothly transitions a load between the different materials of the blade components, thereby limiting an associated stress at the interface.

9 Claims, 6 Drawing Sheets

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 5,281,454 A * | 1/1994 | Hanson | B29C 66/1162 |
| | | | 138/155 |
| 7,334,989 B2 | 2/2008 | Arelt | |
| 7,344,360 B2 | 3/2008 | Wetzel | |
| 7,521,105 B2 | 4/2009 | Bech et al. | |
| 7,901,188 B2 | 3/2011 | Llorente Gonzalez et al. | |
| 7,922,454 B1 | 4/2011 | Riddell | |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,696,317 B2 | 4/2014 | Rudling | |
| 8,777,573 B2 | 7/2014 | Hibbard et al. | |
| 8,919,754 B2 | 12/2014 | Schibsbye | |
| 9,181,701 B2 | 11/2015 | Hofmann | |
| 9,181,923 B2 | 11/2015 | Grabau | |
| 9,669,589 B2 | 6/2017 | Zamora Rodriguez et al. | |
| 9,765,756 B2 | 9/2017 | Hancock | |
| 9,920,630 B2 * | 3/2018 | Dahl | F01D 5/12 |
| 10,669,984 B2 * | 6/2020 | Yarbrough | F03D 1/0675 |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0116938 A1 | 5/2010 | Kline et al. | |
| 2010/0132884 A1 | 6/2010 | Baehmann et al. | |
| 2010/0215494 A1 | 8/2010 | Bech et al. | |
| 2010/0304170 A1 | 12/2010 | Frederiksen | |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0123343 A1 | 5/2011 | Ronner | |
| 2011/0158788 A1 | 6/2011 | Bech et al. | |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0294724 A1 | 11/2012 | Broome et al. | |
| 2012/0308396 A1 | 12/2012 | Hibbard | |
| 2012/0321376 A1 | 12/2012 | Walters | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0154092 A1 * | 6/2014 | Dahl | F03D 1/0675 |
| | | | 416/229 R |
| 2014/0271217 A1 | 9/2014 | Baker | |
| 2014/0286780 A1 | 9/2014 | Lemos et al. | |
| 2015/0204200 A1 | 7/2015 | Eyb et al. | |
| 2015/0369211 A1 | 12/2015 | Merzhaeuser | |
| 2017/0082087 A1 * | 3/2017 | Yarbrough | B29D 99/0028 |
| 2018/0245566 A1 | 8/2018 | Sawada | |
| 2018/0274521 A1 | 9/2018 | Akhtar et al. | |
| 2021/0372366 A1 | 12/2021 | Merzhaeuser et al. | |
| 2022/0082079 A1 | 3/2022 | Huth et al. | |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/018225 A2 | 2/2010 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |
| WO | WO2020092458 A1 | 5/2020 |
| WO | WO2020/131066 A1 | 6/2020 |

* cited by examiner

JOINTED WIND TURBINE ROTOR BLADE HAVING IMPROVED TRANSITIONS BETWEEN VARYING MATERIAL COMBINATIONS

CROSS-REFERENCE TO RELATED APPLICATIONS

The present application claims priority to PCT Application Serial Number PCT/EP2021/073992, filed Aug. 31, 2021, which claims the benefit of Foreign Application Serial Number GB2013647.9, filed Aug. 31, 2020. All of the applications are incorporated by reference herein in their entirety.

FIELD

The present disclosure relates generally to wind turbines, and more particularly to jointed rotor blades for wind turbines having improved transitions between varying material combinations along its span.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g., opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

In recent years, wind turbines for wind power generation have increased in size to achieve improvement in power generation efficiency and to increase the amount of power generation. Along with the increase in size of wind turbines for wind power generation, wind turbine rotor blades have also increased in size. As such, various difficulties, such as a difficulty in integral manufacture and transportation difficulties, may occur in wind turbine rotor blades.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade after, for example, the individual blade segments are transported to the field. However, known joint designs for connecting the blade segments together are not without issue. For example, stress within load-bearing components of the joint between multiple blade segments is a limiting factor of the modular rotor blade that must be considered. More specifically, stresses are often concentrated at interfaces of at least two materials of dissimilar properties.

Thus, the art is continuously seeking new and improved jointed rotor blades for wind turbines. Accordingly, the present disclosure is directed to a jointed rotor blade for a wind turbine having a smoother transition in the load at an interface of multiple materials of dissimilar properties.

BRIEF DESCRIPTION

Aspects and advantages of the invention will be set forth in part in the following description, or may be obvious from the description, or may be learned through practice of the invention.

In one aspect, the present disclosure is directed to a method of joining first and second blade components of a rotor blade of a wind turbine. The method includes arranging the first blade component and the second blade component together at an interface. The first and second blade components are formed of different materials having different stiffnesses. The method further includes providing at least one gap at the interface of the first and second blade components. Further, the method includes securing the blade components together by at least partially filling the gap with at least one filler material. Moreover, the method includes further securing the blade components together via an infusion process, wherein, during the infusion process, additional filler material further fills the gap or covers at least a portion of the at least one filler material. In addition, the method includes allowing the filler material to cure. Thus, upon curing, the filler material is configured to smoothly transition a load between the different materials of the blade components, thereby limiting an associated stress at the interface.

In an embodiment, a modulus of the filler material(s) is less than about 10% of one of the different composite materials and greater than about 10% of the other of the different composite materials. In another embodiment, a width of the gap is between about 5% and about 25% of a thickness of one of the first and second blade components. In further embodiments, the first filler material may include an adhesive, whereas the second filler material may be a resin material. Moreover, in an embodiment, the infusion process may include vacuum infusion, resin transfer molding, or any other suitable infusion process. As used herein, the modulus preferably refers to an elastic modulus. The elastic modulus of the material (e.g. the filler material or the materials of the first blade component and the second blade component) may for instance be determined using a tension or compression test, bending test, or an natural frequency vibration test.

In additional embodiments, providing the gap(s) at the interface of the first and second blade components may include forming one or more features into at least one of the first blade component or the second blade component such that, when the first blade component and the second blade component are arranged together, the one or more features form the gap(s). In such embodiments, the feature(s) may include at least one of a groove, a recess, a protrusion, a chamfer, a fillet, or combinations thereof.

In another embodiment, providing the gap(s) at the interface of the first and second blade components may include removing a portion of material from at least one of the first blade component or the second blade component so as to create the gap(s) at the interface.

In further embodiments, the different materials having the different stiffnesses may include different resin materials, different metal materials, different fiber materials, different fiber orientations, and/or combinations thereof. In such embodiments, the different resin materials may include a thermoset resin or a thermoplastic resin. In further embodiments, the different fiber materials may include glass fibers, carbon fibers, polymer fibers, wood fibers, bamboo fibers, ceramic fibers, nanofibers, metal fibers, or combinations thereof.

In additional embodiments, the first and second blade components may include a blade segment, a blade shell, a pin joint, a spar cap, a shear web, an internal support structure, a receiving section, or combinations thereof.

In another aspect, the present disclosure is directed to a jointed rotor blade for a wind turbine. The rotor blade includes a first blade component formed of a first composite material combination and a second blade component formed of a second composite material combination. The first and second blade components are secured together at an interface comprising at least one gap between the first and second blade components. The first and second composite material combinations are formed of different composite materials having different stiffnesses. The rotor blade also includes at least one filler material filling the at least one gap between the first and second blade components so as to smoothly transition a load between the different composite material combinations of the first and second blade components, thereby limiting an associated stress at the interface, the at least one filler material having a modulus between the different composite materials. In other words, the modulus of the filler material has a modulus that has a value that lies between the moduli of said two different composite materials, or equivalently that the filler material has a modulus that has a higher value than that of the modulus of one of composite materials of the first and second blade components and lower than that of the modulus of the other one of the composite materials of the first and second blade components. It should be understood that the rotor blade may further include any of the additional features described herein.

In yet another aspect, the present disclosure is directed to a method of joining first and second blade components of a rotor blade of a wind turbine. The method includes arranging the first blade component and the second blade component together at an interface. The first and second blade components are formed of different materials having different stiffnesses. The interface includes at least one gap. Thus, the method also includes providing a filler material in the at least one gap so as to fill the at least one gap and join the first and second blade components together, wherein a modulus of the at least one filler material is less than about 90% of one of the different composite materials and greater than about 10% of the other of the different composite materials. Further, the method includes infusing the first and second blade components together using a resin material. Moreover, the method includes allowing the adhesive and the resin material to cure, wherein, upon curing, the adhesive material is configured to smoothly transition a load between the different materials of the first and second blade components, thereby limiting an associated stress at the interface. It should be understood that the method may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
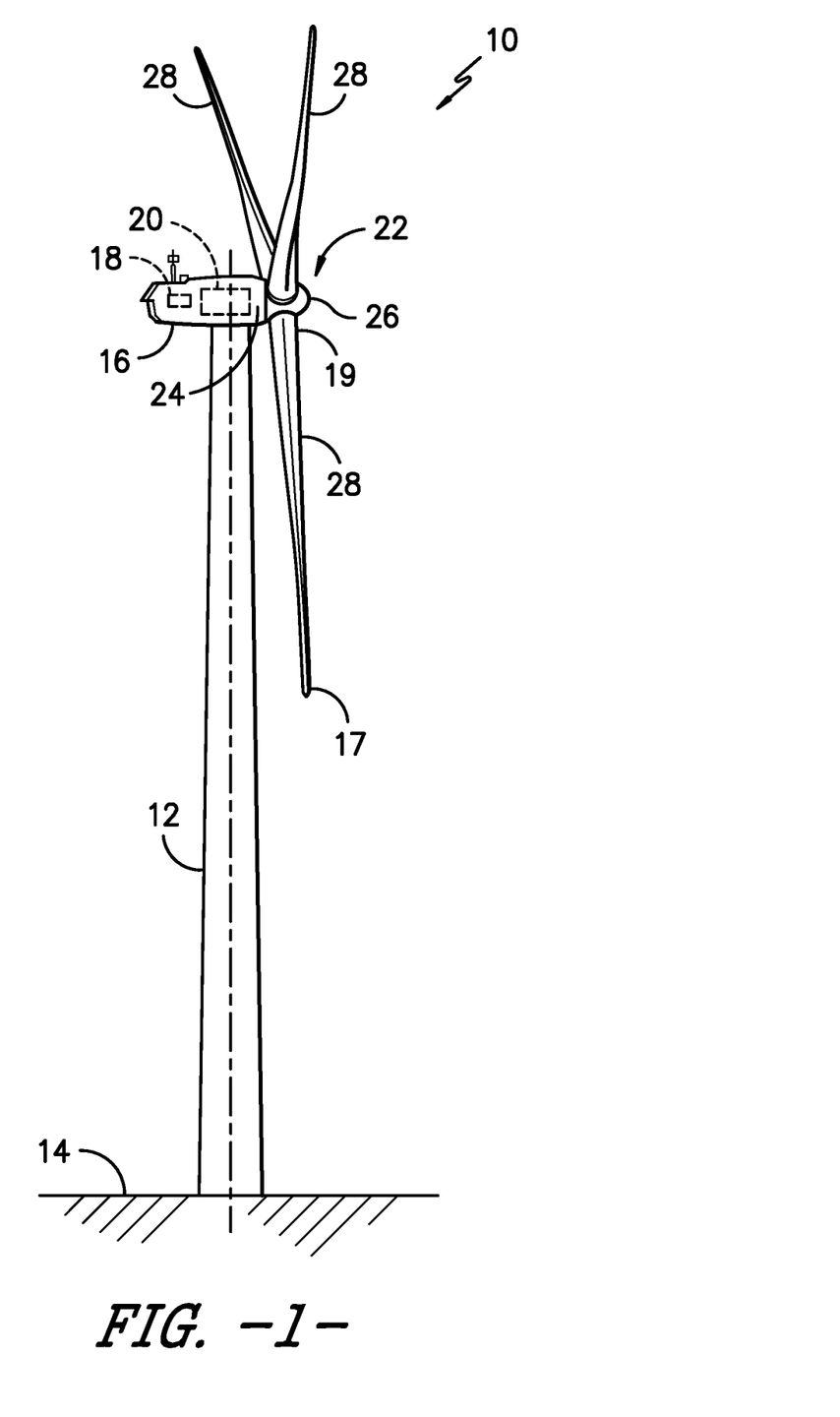
FIG. 1 illustrates a perspective view of one embodiment of a wind turbine according to the present disclosure.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
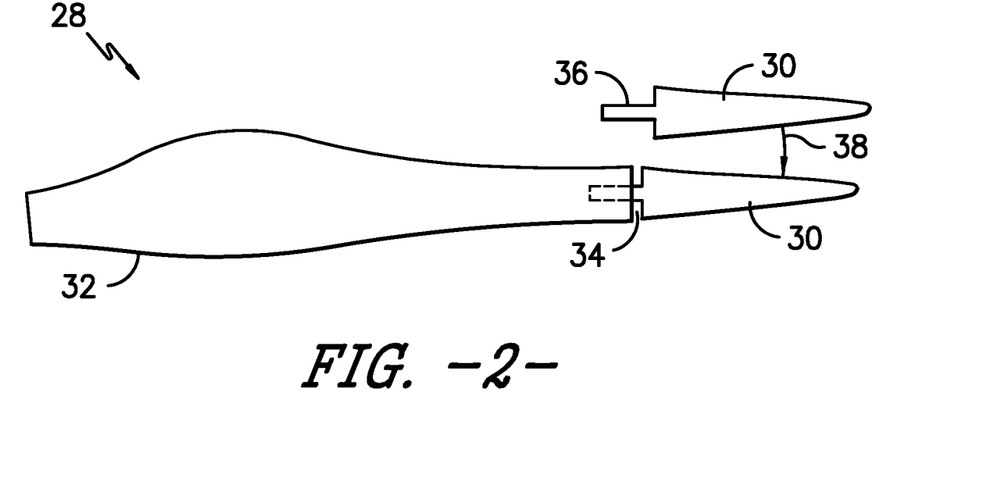
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member defining an airfoil surface. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

Figure 3:
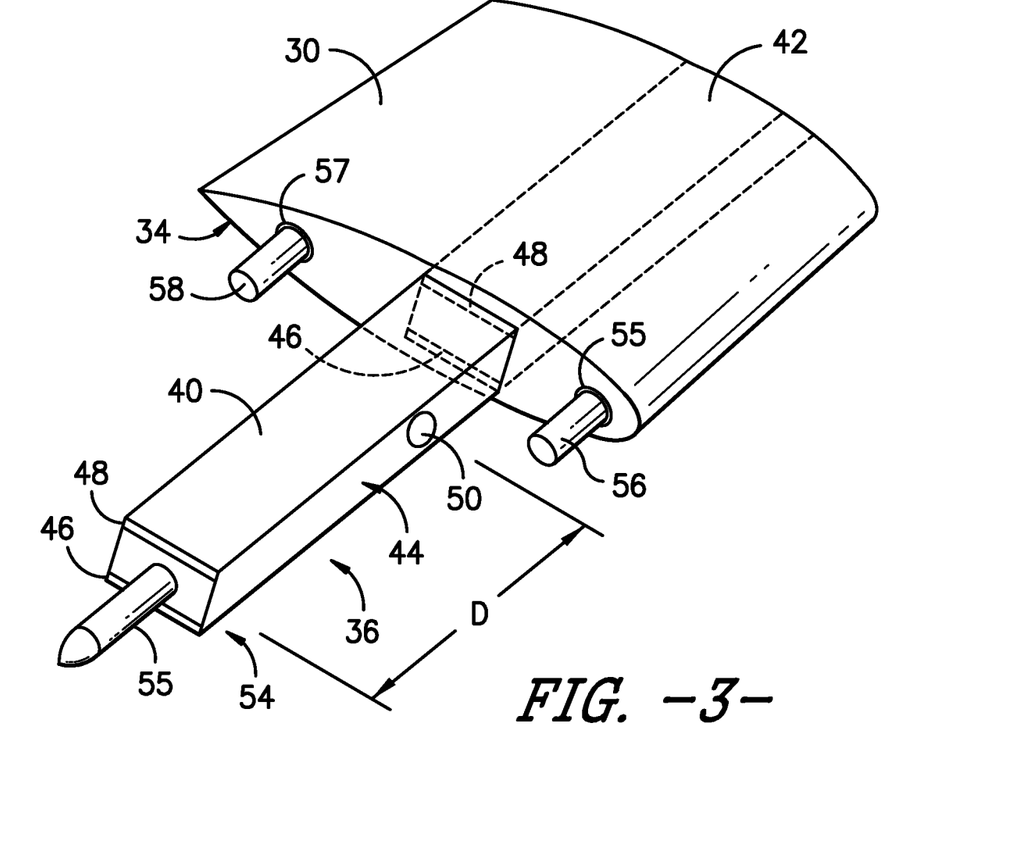
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48.

Moreover, as shown, the first blade segment 30 may include one or more first pin joints towards a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 proximate to the chord-wise joint 34. Moreover, as shown, the pin joint slot 50 may be oriented in a chord-wise direction. In one example, there may be a bushing within the pin joint slot 50 arranged in a tight interference fit with a pin tube or pin (shown as pin 53 in FIG. 6). Further, the first blade segment 30 may include multiple second pin joint tubes 56, 58 located at the chord-wise joint 34. Thus, as shown, the second pin joint tubes 56, 58 may include a leading edge pin joint tube 56 and a trailing edge pin joint tube 58. Further, each of the second pin joint tubes 56, 58 may be oriented in a span-wise direction. In addition, as shown, each of the second pin joint tubes 56, 58 may include multiple flanges 55, 57, respectively, that are configured to distribute compression loads at the chord-wise joint 34.

It is to be noted that the pin tube 52 located at the first end of the beam structure 40 may be separated span-wise with the multiple second pin joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the pin joints connecting the first and second blade segments 30, 32 may include an interference-fit steel bushed joint.

Figure 4:
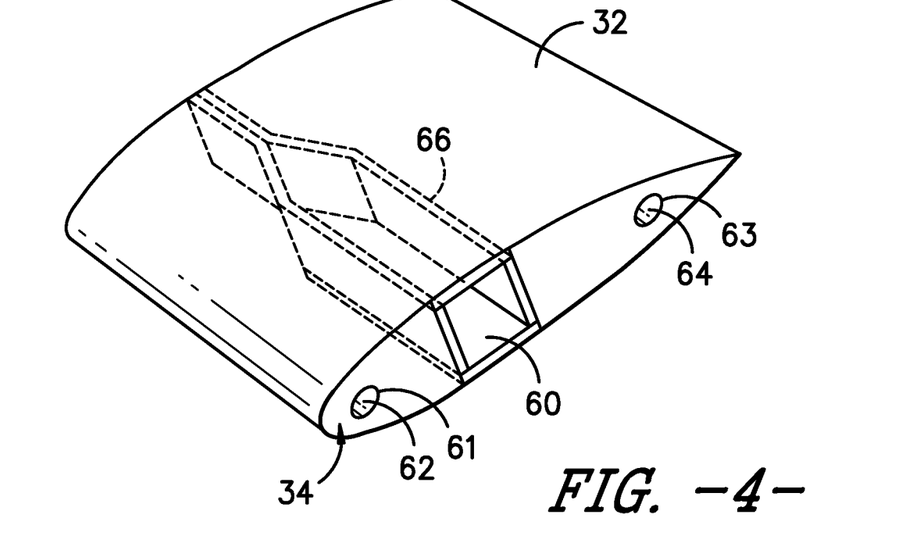
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. The receiving section 60 includes multiple spar structures 66 that extend lengthwise for connecting with the beam structure 40 of the first blade segment 30. As shown, the second blade segment 32 may further include pin joint slots 62, 64 for receiving pin tubes 56, 58 (shown in FIG. 3) of the first blade segment 30 and forming tight interference fittings. In one example, each of the multiple pin joint slots 62, 64 may include multiple flanges 61, 63, respectively, that are configured to distribute compression loads at the chord-wise joint 34.

Figure 5:
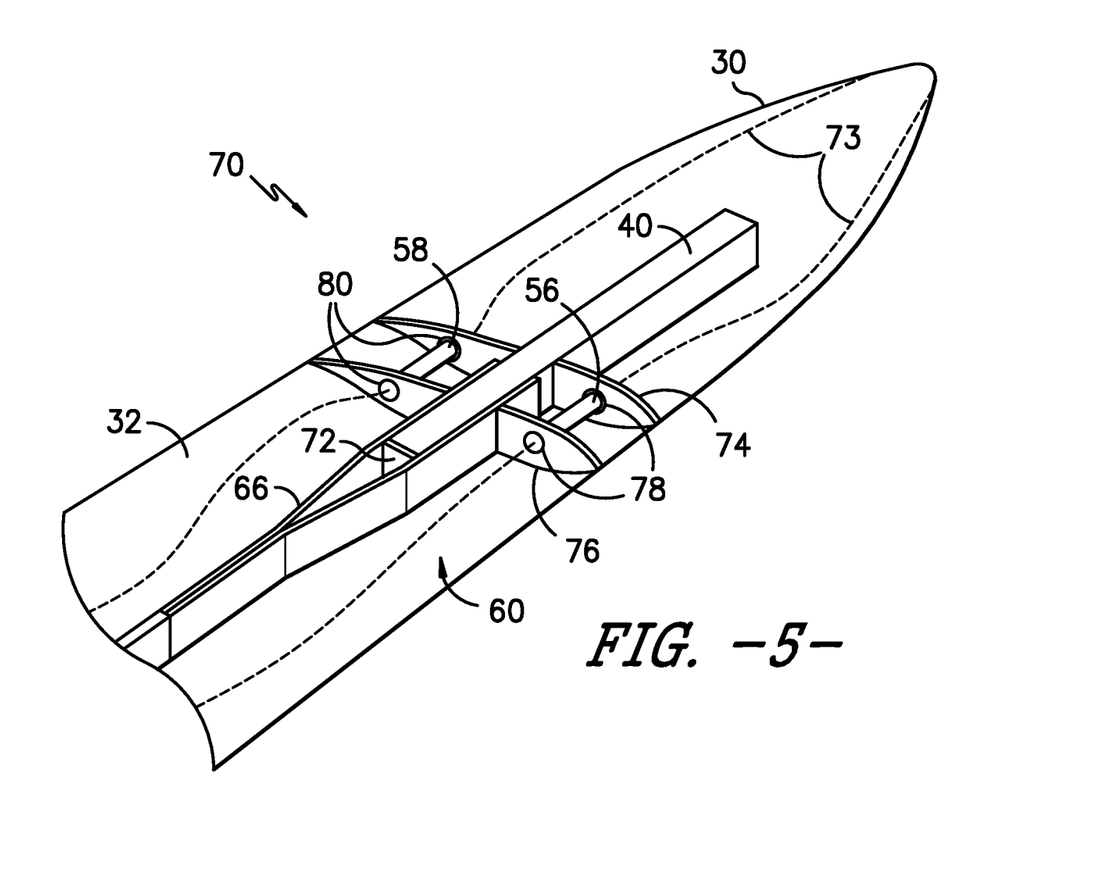
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge pin openings 78 and trailing edge pin openings 80 that allows pin joint connections between the first and second blade segments 30, 32. For example, as shown, the chord-wise members 74, 76 are connected by pin tubes 56 and 58 that are in tight interference fit with bushings located in the leading edge pin openings 78 and the trailing edge pin openings 80. In another embodiment, each of the spar structures 66, the rectangular fastening element 72, and the chord-wise members 74, 76 may be constructed of glass reinforced fibers. In this example, the assembly 70 may also include multiple lightening receptor cables 73 that are embedded between the multiple pin tubes or pins 56, 58 and the bushing connections attached to the chord-wise members 74, 76.

Figure 6:
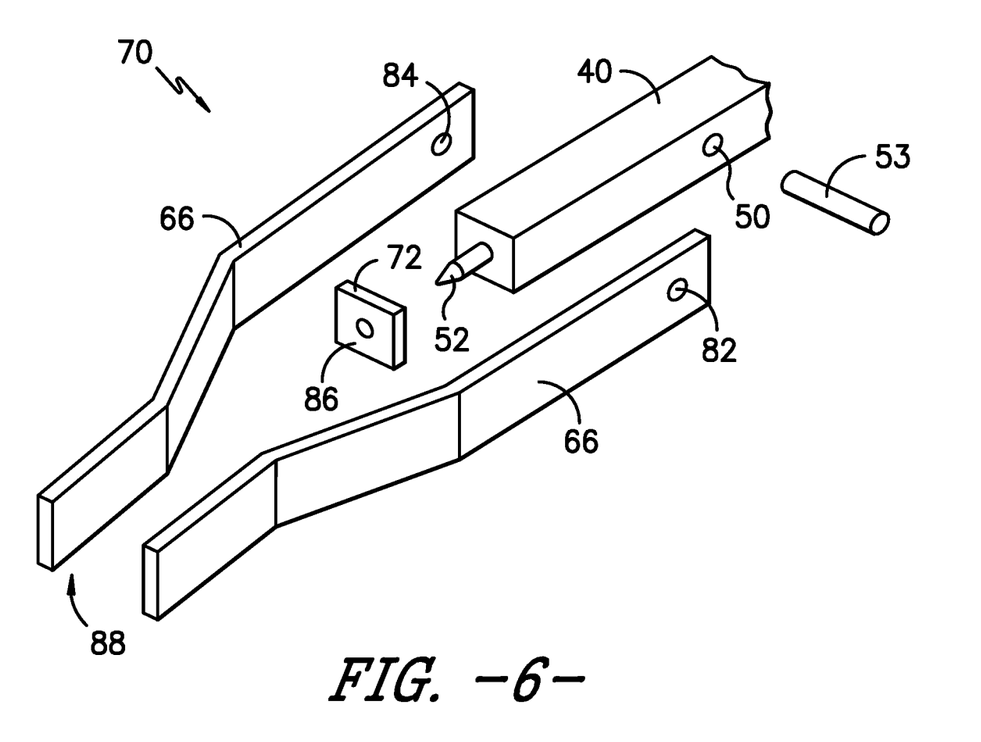
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, a pair of spar structures 66 is configured to receive the beam structure 40 and includes pin joint slots 82, 84 that are aligned with the pin joint slot 50 of the beam structure 40 through which a pin tube or pin 53 may be inserted. Further, the pin 53 is configured to remain in a tight interference fit within the aligning pin joint slots 82, 50, 84 such that spar structures 66 and the beam structure 40 are joined together by during assembling. Further, FIG. 6 also illustrates the rectangular fastening element 72 that includes a pin joint slot 86 configured for receiving the pin tube 52 of the beam structure 40. As such, the pin tube 52 is configured to form a tight interference fit bolted joint. Further, the pair of spar structures 66 may be joined together at one end 88 using any suitable adhesive material or an elastomeric seal.

In general, any of the various blade components described herein (such as the blade segments 30, 32, the shear web 44, the spar caps 46, 48, the pin joint locations, a blade shell, the receiving section 60 and/or the beam structure 40, or combinations thereof, etc.) may include varying material combinations. For example, the varying materials may be chosen to have improved mechanical properties such as tensile, shear and/or compressive strength and/or modulus of elasticity in certain areas to allow for higher concentration of loads (operating stresses) at such locations. Thus, due to the different materials that may be utilized throughout the rotor blade 28, the present disclosure is directed to improving the transition between materials of different stiffness within the jointed rotor blade 28 using designed spaces between the two materials such that infusion resin can fill the spaces to create a specifically designed stiffness transition structure.

Figure 7:
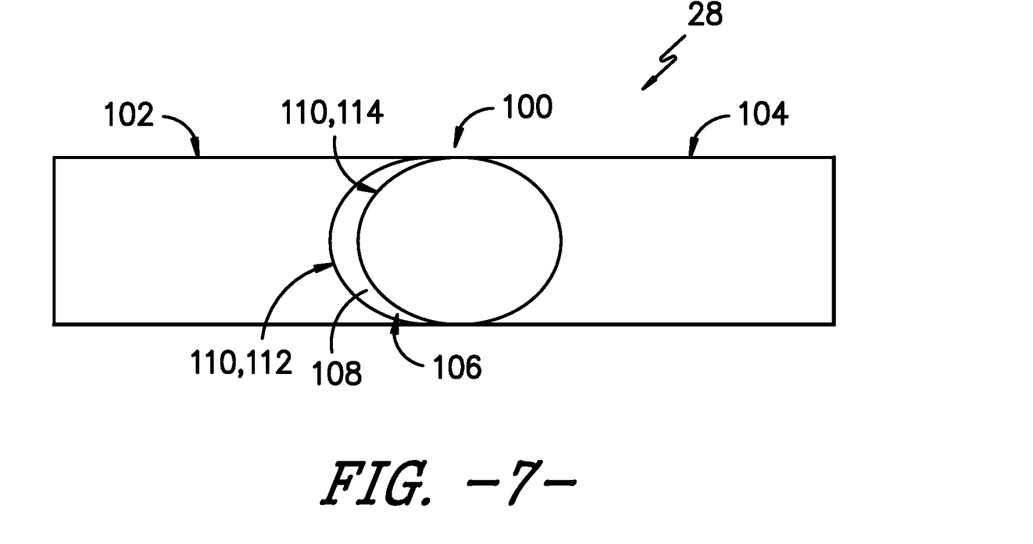
FIG. 7 illustrates a top view of one embodiment of an interface of first and second blade components of a rotor blade formed of dissimilar materials according to the present disclosure.
Figure 8:
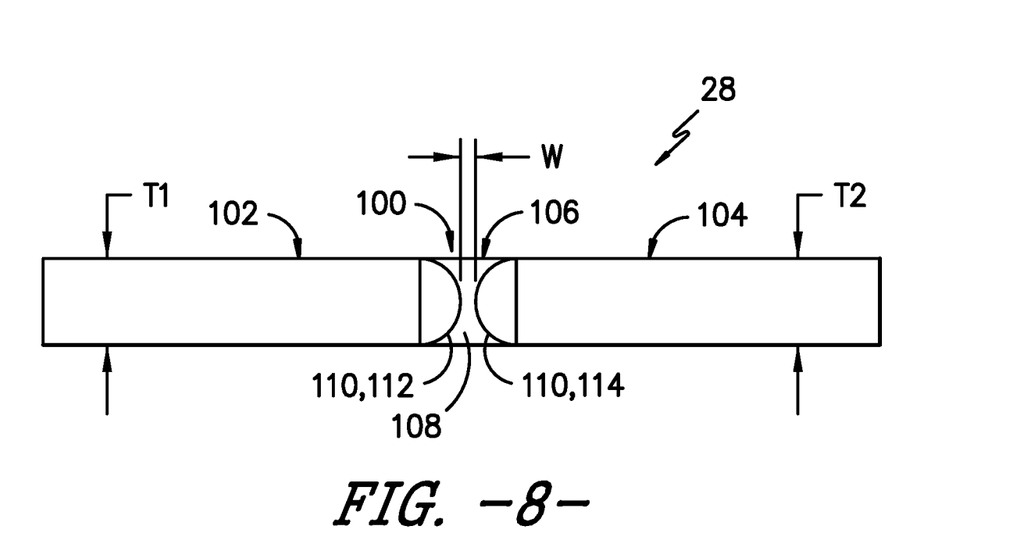
FIG. 8 illustrates a side view of the interface of the first and second blade components of FIG. 7.

More particularly, as shown in FIGS. 7 and 8, various views of an interface 100 between two blade components 102, 104 of dissimilar materials of the rotor blade 28 are illustrated. For example, as shown, the rotor blade 28 includes a first blade component 102 formed of a first composite material combination and a second blade component 104 formed of a second composite material combination. The first and second blade components 102, 104 are secured together at the interface 100, which includes at least one gap 106 (or void of material) between the first and second blade components 102, 104. In certain embodiments, as shown in FIG. 8, a width W of the gap 106 may be measurable, in that the gap 106 is at least about 5% up to about 25% of a thickness (e.g. T1 and T2) of one of the first and second blade components 102, 104. In particular embodiments, as an example, the first and second blade components form at least part of the shear web of the rotor blade 28, where the gap is about 6 millimeters (6 mm), and the thickness of the shear web may be about 40 mm.

For example, in an embodiment, the gap(s) 106 at the interface 100 of the first and second blade components 102, 104 may be created by forming one or more features 110 into the first blade component 102 and/or the second blade component 104 such that, when the first blade component 102 and the second blade component 104 are arranged together, the feature(s) 110 form the gap(s) 106. In such embodiments, the feature(s) 110 may include at least one of a groove, a recess, a protrusion, a chamfer, a fillet, or combinations thereof. In particular, as shown in FIG. 8, each of the first and second blade components 102, 104 includes a chamfered end 112, 114. Accordingly, when arranged together, the chamfered ends 112, 114 of each of the first and second blade components 102, 104 are arranged together, a gap 106 is created since the ends 112, 114 do not abut flush against each other.

Further, the first and second composite material combinations may be formed of different composite materials having different stiffnesses. Moreover, as shown, the rotor blade 28 also includes at least filler material 108 filling the gap(s) 106 between the first and second blade components 102, 104 so as to smoothly transition a load between the different composite material combinations of the first and second components 102, 104, thereby limiting an associated stress at the interface 100. For example, in particular embodiments, a modulus of the filler material(s) 108 may be less than about 90% of one of the different composite materials and greater than about 10% of the other of the different composite materials. Furthermore, in an embodiment, the at least filler material 108 may include a first filler material and a second filler material. In such embodiments, the first filler material may be, as an example, an adhesive, whereas the second filler material may be a resin material.

As described herein, the varying material combinations of the first and second blade components 102, 104 may include any suitable combination of varying resin materials, varying metal materials, varying fiber materials, varying fiber orientations, and/or combinations thereof. The varying resin materials may include, for example, a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

The varying metal materials may include, for example, aluminum, titanium, steel, and/or any other suitable metal or metal alloy material. The varying fiber materials described herein may include, for example, glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof. Further, the fiber content may vary depending on the thickness or stiffness required for transferring the load at a particular location in the shear web 44. For example, in one embodiment, a fiber orientation at the locations of the bolts joints may include, for example, a quasi-isotropic fiber orientation.

Figure 9:
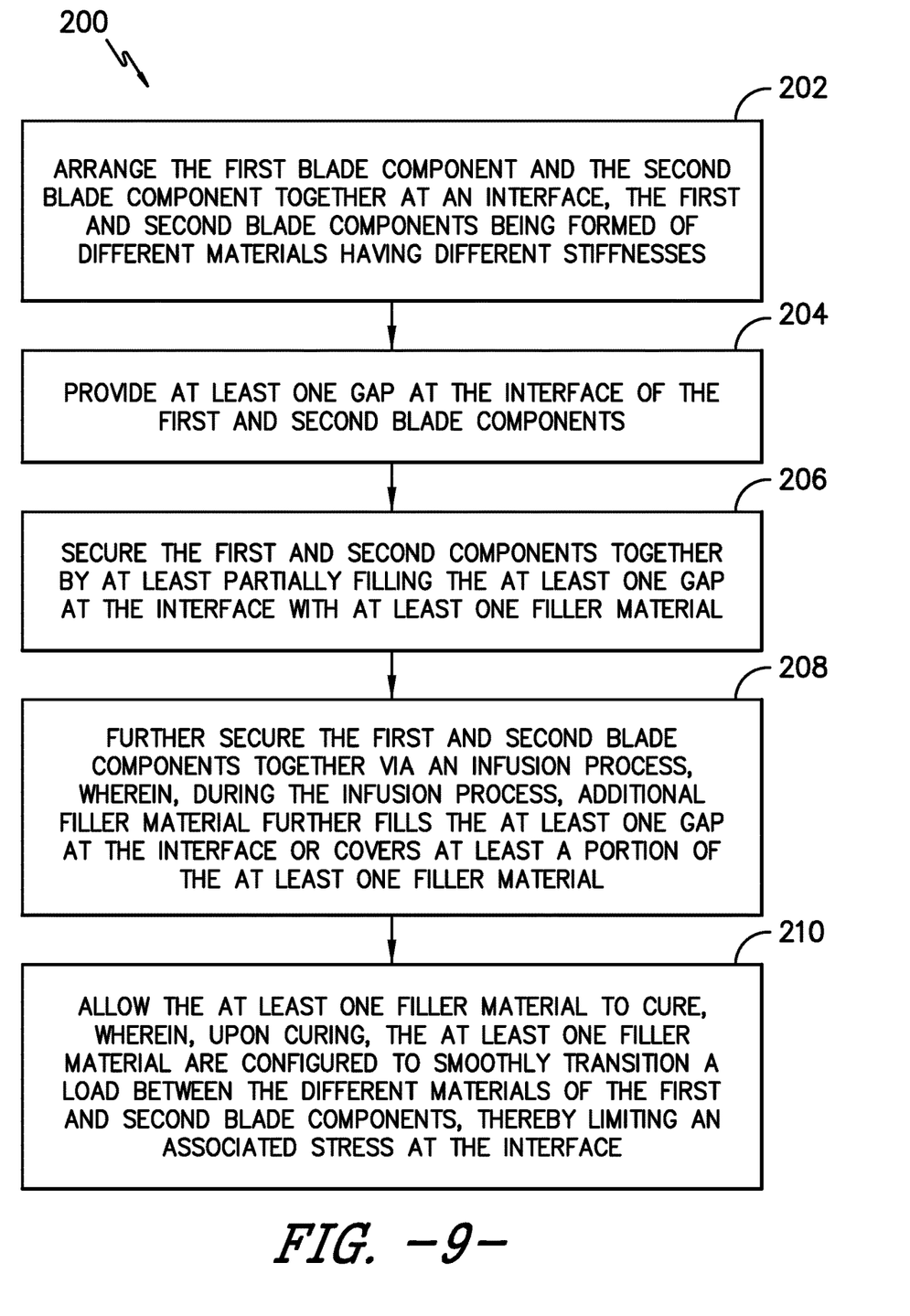
FIG. 9 illustrates a flow diagram of one embodiment of a method of joining first and second blade components of a rotor blade of a wind turbine according to the present disclosure.

Referring now to FIG. 9, a flow diagram 100 of a method of joining first and second blade components of a rotor blade of a wind turbine is illustrated. In general, the method 200 will be described herein with reference to the wind turbine 10 and the rotor blade 28 shown in FIGS. 1-8. However, it should be appreciated that the disclosed method 200 may be implemented with rotor blades having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include arranging the first blade component 102 and the second blade component 104 together at an interface 100. As mentioned, the first and second blade components 102, 104 are formed of different materials having different stiffnesses. As shown at (204), the method 200 may include providing at least one gap 106 at the interface 100 of the first and second blade components 102, 104. For example, in one embodiment, providing the gap(s) 106 at the interface 100 of the first and second blade components 102, 104 may include removing a portion of material from at least one of the first blade component 102 or the second blade component 104 so as to create the gap(s) at the interface 100. Alternatively, in an embodiment, providing the gap(s) 106 at the interface 100 of the first and second blade components 102, 104 may include forming one or more features 110 into at least one of the first blade component 102 or the second blade component 104 such that, when the first blade component 102 and the second blade component 104 are arranged together, the one or more features form the gap(s) 106. Thus, such features 110 may be formed into the ends of the first and second blade components 102, 104 during the manufacturing process. In such embodiments, as mentioned, the feature(s) may include at least one of a groove, a recess, a protrusion, a chamfer, a fillet, or combinations thereof.

Still referring to FIG. 9, as shown at (206), the method 200 may include securing the first and second blade components together by at least partially filling the at least one gap at the interface with at least one filler material, e.g. with an adhesive. As shown at (208), the method 200 includes further securing the first and second blade components together via an infusion process, wherein, during the infusion process, additional filler material, such as a second filler material, further fills the gap(s) at the interface or covers at least a portion of the at least one filler material. For example, in certain embodiments, the infusion process may include vacuum infusion or resin transfer molding. Thus, as shown at (210), the method 200 may include allowing the filler material(s) to cure such that the filler material(s) smoothly transition a load between the different materials of the first and second blade components, thereby limiting an associated stress at the interface. Accordingly, upon curing, the filler material(s) is configured to smoothly transition a load between the different materials of the first and second components 102, 104, thereby limiting an associated stress at the interface 100.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Exemplary embodiments of the present disclosure are set out in the following items:

1. A method of joining first and second blade components of a rotor blade of a wind turbine, the method comprising:
    arranging the first blade component and the second blade component together at an interface, the first and second blade components being formed of different materials having different stiffnesses;
    providing at least one gap at the interface of the first and second blade components;
    securing the first and second blade components together by at least partially filling the at least one gap at the interface with at least one filler material;
    further securing the first and second blade components together via an infusion process, wherein, during the infusion process, additional filler material further fills the at least one gap at the interface or covers at least a portion of the at least one filler material; and
    allowing the at least one filler material to cure, wherein, upon curing, the filler material is configured to smoothly transition a load between the different materials of the first and second blade components, thereby limiting an associated stress at the interface.

2. The method of item 1, wherein a modulus of the at least one filler material is less than about 90% of one of the different composite materials and greater than about 10% of the other of the different composite materials.

3. The method of items 1-2, wherein a width of the at least one gap is between about 5% and about 25% of a thickness of one of the first and second blade components.

4. The method of any of the preceding items, wherein the first filler material comprises an adhesive and the second filler material is a resin material.

5. The method of any of the preceding items, wherein the infusion process comprises at least one of vacuum infusion or resin transfer molding.

6. The method of any of the preceding items, wherein providing the at least one gap at the interface of the first and second blade components further comprises:
    forming one or more features into at least one of the first blade component or the second blade component such that, when the first blade component and the second blade component are arranged together, the one or more features form the at least one gap.

7. The method of item 4, wherein the one or more features comprise at least one of a groove, a recess, a protrusion, a chamfer, a fillet, or combinations thereof.

8. The method of any of the preceding items, wherein providing the at least one gap at the interface of the first and second blade components further comprises:
 removing a portion of material from at least one of the first blade component or the second blade component so as to create a gap at the interface.

9. The method of any of the preceding items, wherein the different materials having different stiffnesses comprises at least one of different resin materials, different metal materials, different fiber materials, different fiber orientations, and/or combinations thereof, the different resin materials comprising at least one of a thermoset resin or a thermoplastic resin, the different fiber materials comprising at least one of glass fibers, carbon fibers, polymer fibers, wood fibers, bamboo fibers, ceramic fibers, nanofibers, metal fibers, or combinations thereof.

10. The method of any of the preceding items, wherein the first and second blade components comprise at least one of a blade segment, a blade shell, a pin joint, a spar cap, a shear web, an internal support structure, a receiving section, or combinations thereof.

11. A jointed rotor blade for a wind turbine, comprising:
 a first blade component formed of a first composite material combination;
 a second blade component formed of a second composite material combination, the first and second blade components secured together at an interface comprising at least one gap between the first and second blade components, the first and second composite material combinations being formed of different composite materials having different stiffnesses; and
 at least one filler material at least partially filling the at least one gap between the first and second blade components so as to smoothly transition a load between the different composite material combinations of the first and second blade components, thereby limiting an associated stress at the interface, the at least one filler material having a modulus between the different composite materials.

12. The rotor blade of item 11, wherein the modulus of the at least one filler material is less than about 90% of one of the different composite materials and greater than about 10% of the other of the different composite materials.

13. The rotor blade of items 11-12, wherein a width of the at least one gap is between about 5% and about 25% of a thickness of one of the first and second blade components.

14. The rotor blade of items 11-13, wherein at least one of the first blade component or the second blade component comprises one or more features formed therein such that, when the first blade component and the second blade component are arranged together, the one or more features form the at least one gap.

15. The rotor blade of item 14, wherein the one or more features comprise at least one of a groove, a recess, a protrusion, a chamfer, a fillet, or combinations thereof.

16. The rotor blade of items 11-15, wherein the different materials having different stiffnesses comprises at least one of different resin materials, different metal materials, different fiber materials, different fiber orientations, and/or combinations thereof, the different resin materials comprising at least one of a thermoset resin or a thermoplastic resin, the different fiber materials comprising at least one of glass fibers, carbon fibers, polymer fibers, wood fibers, bamboo fibers, ceramic fibers, nanofibers, metal fibers, or combinations thereof.

17. The rotor blade of item 15, wherein the first and second blade components comprise at least one of a blade segment, a blade shell, a pin joint, a spar cap, a shear web, an internal support structure, a receiving section, or combinations thereof.

18. A method of joining first and second blade components of a rotor blade of a wind turbine, the method comprising:
 arranging the first blade component and the second blade component together at an interface, the first and second blade components being formed of different materials having different stiffnesses;
 providing at least one gap at the interface of the first and second blade components;
 providing a filler material in the at least one gap so as to at least partially fill the at least one gap and join the first and second blade components together, wherein a modulus of the at least one filler material is less than about 90% of one of the different composite materials and greater than about 10% of the other of the different composite materials;
 infusing the first and second blade components together using a resin material; and
 allowing the adhesive and the resin material to cure, wherein, upon curing, the adhesive material is configured to smoothly transition a load between the different materials of the first and second blade components, thereby limiting an associated stress at the interface.

19. The method of item 18, further comprising at least one of forming one or more features into at least one of the first blade component or the second blade component such that, when the first blade component and the second blade component are arranged together, the one or more features form the at least one gap or removing a portion of material from at least one of the first blade component or the second blade component so as to form the at least one gap.

20. The method of items 18-19, wherein a width of the at least one gap is between about 5% and about 25% of a thickness of one of the first and second blade components.

What is claimed is:

1. A method of joining first and second blade components of a rotor blade of a wind turbine, the method comprising:
 arranging the first blade component and the second blade component together at an interface, the first and second blade components being formed of different materials having different stiffnesses;
 providing at least one gap at the interface of the first and second blade components by removing a portion of material from at least one of the first blade component or the second blade component so as to create the at least one gap at the interface;
 securing the first and second blade components together by partially filling the at least one gap at the interface with a first filler material;
 further securing the first and second blade components together via an infusion process, wherein, during the infusion process, a second filler material further fills the at least one gap at the interface or covers at least a portion of the first filler material; and
 allowing the first and second filler materials to cure, wherein, upon curing, the first and second filler materials are configured to transition a load between the different materials of the first and second blade components, thereby limiting an associated stress at the interface.

2. The method of claim 1, wherein the different materials comprise different composite materials, wherein an elastic modulus of the first filler material is less than about 90% of one of the different composite materials and greater than about 10% of the other of the different composite materials.

3. The method of claim 1, wherein a width of the at least one gap is between about 5% and about 25% of a thickness of one of the first and second blade components.

4. The method of claim 1, wherein the first filler material comprises an adhesive and the second filler material is a resin material.

5. The method of claim 1, wherein the infusion process comprises at least one of vacuum infusion or resin transfer molding.

6. The method of claim 1, wherein the different materials having different stiffnesses comprises at least one of different resin materials, different metal materials, different fiber materials, different fiber orientations, and/or combinations thereof.

7. The method of claim 1, wherein the first and second blade components comprise at least one of a blade segment, a blade shell, a pin joint, a spar cap, a shear web, an internal support structure, a receiving section, or combinations thereof.

8. A method of joining first and second blade components of a rotor blade of a wind turbine, the method comprising:

arranging the first blade component and the second blade component together at an interface, the first and second blade components being formed of different materials having different stiffnesses;

providing at least one gap at the interface of the first and second blade components by removing a portion of material from at least one of the first blade component or the second blade component so as to create the at least one gap at the interface;

providing a filler material in the at least one gap so as to partially fill the at least one gap and join the first and second blade components together, wherein the different materials comprise different composite materials, wherein an elastic modulus of the filler material is less than about 90% of one of the different composite materials and greater than about 10% of the other of the different composite materials;

infusing the first and second blade components together using a resin material; and allowing the filler material and the resin material to cure, wherein, upon curing, the filler and resin materials are configured to transition a load between the different materials of the first and second blade components, thereby limiting an associated stress at the interface.

9. The method of claim 8, wherein a width of the at least one gap is between about 5% and about 25% of a thickness of one of the first and second blade components.

* * * * *